United States Patent
Eckert et al.

(10) Patent No.: US 7,949,517 B2
(45) Date of Patent: May 24, 2011

(54) DIALOGUE SYSTEM WITH LOGICAL EVALUATION FOR LANGUAGE IDENTIFICATION IN SPEECH RECOGNITION

(75) Inventors: Martin Eckert, Berlin (DE); Roman Englert, Buschhoven Gem. Swisttal (DE); Wiebke Johannsen, Berlin (DE); Fred Runge, Wuensdorf (DE); Markus Van Ballegooy, Bonn (DE)

(73) Assignee: Deutsche Telekom AG, Bonn (DE)

( * ) Notice: Subject to any disclaimer, the term of this patent is extended or adjusted under 35 U.S.C. 154(b) by 788 days.

(21) Appl. No.: 11/949,341

(22) Filed: Dec. 3, 2007

(65) Prior Publication Data
US 2008/0162146 A1 Jul. 3, 2008

(30) Foreign Application Priority Data
Dec. 1, 2006 (DE) .................. 10 2006 057 159

(51) Int. Cl.
G10L 15/22 (2006.01)
G06F 17/20 (2006.01)
(52) U.S. Cl. ......... 704/8; 704/255; 704/257; 379/88.05; 379/88.06
(58) Field of Classification Search .............. 704/8, 233, 704/255, 277, 257; 379/88.05, 88.06
See application file for complete search history.

(56) References Cited

U.S. PATENT DOCUMENTS

| | | | | |
|---|---|---|---|---|
| 5,689,616 A * | 11/1997 | Li | ................. | 704/232 |
| 5,758,023 A | 5/1998 | Bordeaux | | |
| 5,805,771 A | 9/1998 | Muthusamy et al. | | |
| 6,061,646 A * | 5/2000 | Martino et al. | ................. | 704/3 |
| 6,173,266 B1 * | 1/2001 | Marx et al. | ................. | 704/270 |
| 6,321,372 B1 * | 11/2001 | Poirier et al. | ................. | 717/122 |
| 6,549,883 B2 * | 4/2003 | Fabiani et al. | ................. | 704/10 |
| 6,675,134 B2 | 1/2004 | Dempsey et al. | | |
| 6,999,932 B1 | 2/2006 | Zhou | | |
| 7,043,431 B2 * | 5/2006 | Riis et al. | ................. | 704/259 |
| 7,337,115 B2 * | 2/2008 | Liu et al. | ................. | 704/246 |
| 7,349,843 B1 * | 3/2008 | Beck | ................. | 704/231 |
| 7,539,296 B2 * | 5/2009 | Basson et al. | ................. | 379/265.12 |
| 7,809,117 B2 * | 10/2010 | Runge et al. | ................. | 379/88.13 |
| 7,840,399 B2 * | 11/2010 | Suontausta et al. | ................. | 704/8 |
| 7,873,517 B2 * | 1/2011 | Prieto et al. | ................. | 704/255 |
| 2002/0173945 A1 * | 11/2002 | Fabiani et al. | ................. | 704/1 |
| 2004/0039570 A1 | 2/2004 | Harengel et al. | | |
| 2004/0073423 A1 * | 4/2004 | Freedman | ................. | 704/235 |

(Continued)

FOREIGN PATENT DOCUMENTS

DE 69427083 T2 12/2001
(Continued)

OTHER PUBLICATIONS

Introduction and Overview of W3C Speech Interface Framework http://www.w3.org/TR/2000/WD-voice-intro-20001204/, Dec. 2000.

(Continued)

Primary Examiner — Martin Lerner
(74) Attorney, Agent, or Firm — Leydig, Voit & Mayer, Ltd.

(57) ABSTRACT

A method and device are provided for classifying at least two languages in an automatic dialogue system, which processes digitized speech input. At least one speech recognition method and at least one language identification method are used on the digitized speech input in order, by logical evaluation of the results of the method, to identify the language of the speech input.

28 Claims, 9 Drawing Sheets

U.S. PATENT DOCUMENTS

| | | | |
|---|---|---|---|
| 2004/0153306 A1 | 8/2004 | Tanner et al. | |
| 2005/0033575 A1 | 2/2005 | Schneider | |
| 2005/0267755 A1 | 12/2005 | Suontausta | |
| 2006/0227945 A1* | 10/2006 | Runge et al. | 379/88.05 |
| 2007/0198273 A1* | 8/2007 | Hennecke | 704/277 |

FOREIGN PATENT DOCUMENTS

| | | |
|---|---|---|
| DE | 60125397 T2 | 10/2007 |
| EP | 1217610 A1 | 6/2002 |
| EP | 1693828 A1 | 8/2006 |
| WO | 9743707 A1 | 11/1997 |
| WO | 0250817 A1 | 6/2002 |
| WO | 03060877 A1 | 7/2003 |
| WO | 2005086136 A1 | 9/2005 |

OTHER PUBLICATIONS

"Mixed language", http://www.loquendo.com/en/news/whitepaper_ML.htm, Retrieved Aug. 6, 2008.

Nagarajan, T et al., "Language Identification Using Paralled Syllable-Like Unit Recognition", IEEE 2004, pp. 401-404.

Azevedo, J. "Multilinguality in voice activated information services: the P502 EURESCOM project", in IVTTA'98, pp. 49-54.

Zissman, M. (1996) Comparison of Four Approaches to Automatic Language Identification of Telephone Speech. IEEE Transactions on Speech and Audio Processing., 4(1).

Muthusamy Y. et al,. (1996), Automatic Language Identification. In Cole, R. et al (editors): Survey of the State of the Art in Human Language Technology. Cambridge University Press (pp. 273-276).

Muthusamy, Y. K. et al., (1994), "Reviewing automatic language identification," IEEE Signal Processing Mug., vol. 11, No. 4, p. 3341.

Matejka P. et al., (2004), Automatic Language Identification Using Phoneme and Automatically Derived Unit Strings. Lecture Notes in Computer Science., 2004 (3206),8.

Ramus F. et al (1999), Correlates of linguistic rhythm in the speech signal. Cognition., 73.

Niesler, et al, "Language Identification and Multilingual Speech Recognition Using Discriminatively Trained Acoustic Models." In. ISCA Tutorial and Research Workshop (ITRW) on Multilingual Speeach and Language Processing (Multiling-2006), Apr. 9-11, 2006.

German Search Report for DE 10 2006 057 159.2, dated Apr. 9, 2008.

* cited by examiner

| Description | Comment | Example |
|---|---|---|
| default | Preset language, which is active when starting the dialogue | German |
| language 1 | Language in which the language dialogue is additionally provided | English |
| language N* | One of the languages in which the language dialogue is additionally provided | Turkish |
| * The number of additional languages und sequence of numeration is optional | | |

Fig.7

| 1.ASR (with preset default language) | L-ID (Language identification) | 2. ASR (set on language 1, applying on Buffer) | Validation | System reaction |
|---|---|---|---|---|
| match | default (pre-selected language) | n/a | Pre set language safe | continue without change of language * |
| match | Language 1 | match | Tendency to language 1 | Request to change of language ** |
| match | Language 1 | nomatch | Pre set language (default) feasible | continue without change of language * |
| match | unknown (language unknown) | n/a | Pre set language (default) very likely | continue without change of language * |
| nomatch | default (pre set language) | n/a | Result doubtful | multiligual Escalation *** |
| nomatch | language | match | Definite tendency to language 1 | Information of users about change of language and continuation of dialogue |
| nomatch | language 1 | nomatch | Tendency to language 1 | Question change of language** |
| nomatch | unknown (language unknown) | n/a | Result doubtful | multilingual Escalation *** |
| Noinput | n/a | n/a | Result doubtful | multilingual Escalation *** |

* language identification will be deactivated after this step,

** continue with decision matrix step 2a,

*** continue with decision matrix step 2b n/a no analysis: No analysis took place, since either the 1.ASR provided the value noinput or the language classification as language classifier as return value of language of the 1. language classifier process (2) and thus, a second language classifier process under use of the Buffer content (4) is not necessary.

Fig. 8

| 1. ASR and 2. ASR Step 1** | 1.ASR | L-ID | L-ID Step 1 | System Reaction |
|---|---|---|---|---|
| match | ja/yes/eved | n/a | none-relevant | Info language change and continue * |
| match | nein/no/hayır | n/a | none-relevant | Info language remains and continue * |
| match | nomatch | default | none-relevant | Info language remains and continue * |
| match | nomatch | language 1 | language 1 | Info language change and continue * |
| match | nomatch | language 1 | language 2 | Forwarding to consultant |
| match | nomatch | language 2 | language 1 | Forwarding to consultant |
| nomatch | nomatch | language 2 | language 2 | Info language change and continue * |
| nomatch | nomatch | language unknown | none-relevant | Forwarding to consultant |
| nomatch | noinput | n/a | none-relevant | Forwarding to consultant |
| nomatch | ja/yes/eved | n/a | none-relevant | Info change of language and request ** |
| nomatch | nein/no/hayır | n/a | none-relevant | Info language remains and request ** |
| nomatch | nomatch | default | none-relevant | Info language remains and request ** |
| nomatch | nomatch | language 1 | language 1 | Info language change and request ** |
| nomatch | nomatch | language 1 | language 2 | Forwarding to consultant |
| nomatch | nomatch | language 2 | language 1 | Forwarding to consultant |
| nomatch | nomatch | language 2 | language 2 | Info change of language and request ** |
| nomatch | nomatch | language unknown | none-relevant | Forwarding to consultant |
| nomatch | noinput | n/a | none-relevant | Forwarding to consultant |

\* the old request out of the Buffer is picked-up to continue the dialogues, \*\* normal *nomatch* -Escalation Step in uniligual dialogue
\*\* according to table 10.2, the results of 1.ASR and 2 ASR always match to achieve step 2a (match or nomatch)

Fig.9

| 1.ASR | L-ID | 2.ASR (Buffer) | System Reaction |
|---|---|---|---|
| match | n/a | n/a | Continue without change of language * |
| nomatch | default | n/a | Forwarding to consultant |
| nomatch | language 1 | match | Info change of language and continue |
| nomatch | language 1 | nomatch | Forwarding to consultant |
| nomatch | unknown | n/a | Forwarding to consultant |
| noinput | n/a | n/a | Forwarding to consultant |
| * if valid assertion is noted, the dialogue will continue immediately, sind clear tedency to default of language existed before ||||

Fig.10

DIALOGUE SYSTEM WITH LOGICAL EVALUATION FOR LANGUAGE IDENTIFICATION IN SPEECH RECOGNITION

CROSS REFERENCE TO RELATED APPLICATIONS

This application claims benefit of German Patent Application No. 10 2006 057 159.2, filed Dec. 1, 2006, which is hereby incorporated by reference herein.

FIELD

The invention relates to a method and device for classifying spoken language.

BACKGROUND

When designing a multilingual speech application with automatic classification of the language ("language identification") used by the user, the question arises as to how the user can be motivated to speak freely in his or her mother tongue. As will be described in the following section, various methods exist for classifying spoken language, each of which is based on the sole use of a single method for processing the acoustic and/or phonetic speech stream. Since these technologies have their main application in the field of speech dialogue systems, other speech processing technologies, such as speech recognition and/or speaker verification, which serve for recognizing spoken words and/or sentences or for verifying or identifying the speaker are also essentially available. Furthermore, speech dialogue systems may also have additional user recognition-related data which can explicitly or implicitly impart additional information about the language spoken (e.g. German, English, French, Spanish, Turkish, etc.) that may be made used by a particular user of a speech dialogue application. The separate use of technologies for classifying spoken language is still partly error-prone. An important aim must therefore be to reduce this error rate, possibly through the combined application of other technologies.

A general structure of dialogue systems that are used for linguistic and, similarly, multimodal interaction with at least one user is known. Monolingual speech dialogue applications fulfill the requirements of a multilingual client circle only incompletely. For this reason, speech dialogue applications are being developed that determine the language spoken using the technology of language identification based on an utterance by the caller in order to switch speech output and speech recognition grammars to the relevant language, if possible, directly following the first utterance. For this purpose, the user must be notified that the possibility exists of also using the application in a different language from the base language.

A common procedure for notifying a user of this possibility of using a language application in a language other than the main language is extending an introductory speech output prompt by adding appropriate informative statements. Following the greeting, for example, the option may be put to the user as follows: "To use the service in English, say English; pour le service en Français, dites Français; um den deutschen Dienst zu nutzen, sagen Sie Deutsch; . . . " Azevedo, J./Beires, N./Charpentier, Francis/Farrell, M./Johnston, D./LeFlour, E./Micca, G./Militello, S./Schroeder, K. (1998): "Multilinguality in voice activated information services: the P502 EURESCOM project", In IVTTA'98, 49-54. Depending on the answer given by the user, the dialogue application is switched to the relevant language without further use of speech recognition technologies.

If the technology of language identification is used, the user no longer has to give the designation of the language explicitly, but can directly answer a question which corresponds to the aim of the dialogue application in his mother tongue. The formulation of this question should contain an indication of this possibility.

The speech output can be generated either with the aid of recorded speech or by speech synthesis (text-to-speech). Modern text-to-speech systems also include methods for reproducing sequential mixed-language texts in sequence acoustically, adapting the pronunciation to phonetic characteristics of different languages ("mixed language").

Language identification (L-ID) usually takes place immediately following the first output prompt, based on the first utterance of the caller. The most important point is therefore to motivate the caller to make his first utterance in his mother tongue.

Various methods of language identification are described in:

Muthusamy, Y. and Spitz, A. (1996). Automatic Language Identification. In Cole, R., Mariani, J., Uszkoreit, H., Varile G., Zaenen, A., Zompolli, A., and Zue, V. (edtrs.): Survey of the State of the Art in Human Language Technology. Cambridge University Press (pp. 273-276);

Zissman, M. (1996) Comparison of Four Approaches to Automatic Language Identification of Telephone Speech. IEEE Transactions on Speech and Audio Processing., 4(1);

Y. K. Muthusamy, E. Barnard, and R. A. Cole (1994), "Reviewing automatic language identification," IEEE Signal Processing Mug., vol. 11, no. 4, pp. 3341;

Matejka P., Szöke, I., Schwarz, P., and Cernocky, J. (2004). Automatic Language Identification using Phoneme and Automatically Derived Unit Strings. Lecture Notes in Computer Science., 2004 (3206), 8;

Nagarajan T., and Murthy, H. (2004). Language identification using parallel syllable-like unit recognition. In Proceesings of the IEEE International Conference on Acoustics, Speech and Signal Processing (ICASSP'04). Montreal, Canada (pp. 401-404); and Ramus, F., Nespor, M., and Mehler, J. (1999). Correlates of linguistic rhythm in the speech signal. Cognition., 73.

Following the utterance by the caller, the language identification system usually detects which language was spoken. If one of the possible foreign languages has been positively identified, then the required language-dependent settings of the dialogue application are automatically carried out and a changeover is made into the relevant dialogue language.

Also known are methods in which speech recognition and or language identification are not only used in real time on an acoustic speech stream, but are applied to a buffer region with digitized acoustic information in the form of memory regions or files.

It is essentially possible to activate the grammar for a speech recognizer and a speech dialogue in a plurality of languages simultaneously, so that answers can also be recognized simultaneously in a plurality of languages. However, where vocabularies are relatively large, this also leads to an increase in the possibilities for confusion between individual elements of the grammar, so that multilingual grammars can only be used in selected cases.

SUMMARY

It is an aspect of the present invention to provide an efficient language identification method and system.

In an embodiment, the present invention provides a method for classification of at least two languages in an automatic computer based dialogue system, which processes digitized speech input using a processing unit. The method includes the step of applying a speech recognition method and a language identification method to the digitized speech input. The method further includes the step of identifying the language of the speech input using logical evaluation of results of the speech recognition method and the language identification method.

BRIEF DESCRIPTION OF THE DRAWINGS

Aspects of the present invention will now be described by way of exemplary embodiments with reference to the following drawings, in which:

FIG. 7 is a table showing designations of languages;

FIGS. 8, 9 and 10 are tables showing exemplary decision matrixes.

DETAILED DESCRIPTION

Aspects of the present invention involve considerations concerning the meaningful linking of the results of methods which serve for language identification in the context of spoken language (e.g. German, English, French, Spanish, Turkish, etc.) and for speech recognition within the context of the conversion of spoken language into character sequences, wherein this linking is directed towards the aim of increasing the reliability of the decision about the language in which a speech dialogue is to be conducted between the system and the user, as compared with separate use of the methods.

The results of technologies for language identification and speech recognition are subject to a certain degree of uncertainty, so that it is entirely possible that an utterance in German is indeed recognized by the language identification system as an utterance in German, but that a speech recognition system set to German does not produce any result and that a speech recognition system set to English returns a seemingly meaningful word or a sequence of words as a less plausible result, which leads to uncertainty when deciding for a particular language. In this event, further dialogue steps may, for example, be necessary to clarify which language is being spoken. This uncertainty may be expressed, for example, with probabilities or confidence values.

It is also possible, for example, for an utterance made in German to be classified as English and for the recognition of meaningful sequences of words to take place with a speech recognition process set to German. In the latter case, a system should probably be prompted to carry out further processing of the speech stream in order to obtain plausible results.

In the simplest case, decisions can naturally be made by a decision-making logic included in the system if a speech recognition system set to a particular language provides meaningful results and given confirmation of the set language by the language identification system.

In order to minimise the number of erroneous decisions for a particular language, the use of a decision-making logic is therefore required, to check the plausibility of results linkages.

Compared with separate use of language identification, use of the multiple-step combined method, as described below, in speech dialogue systems results in a substantial reduction in the error rate for identification of the language spoken. An advantage therein is that no additional resources are necessary, but additional combined use of the speech recognition systems in speech dialogue systems results in improved success rates for the achievement of the end result.

The combination of the technology of language identification with the possibilities of a speech dialogue system and further technologies employed therein (e.g. speech recognition) greatly improves the reliability of the result (identification of the language).

Figure 1:
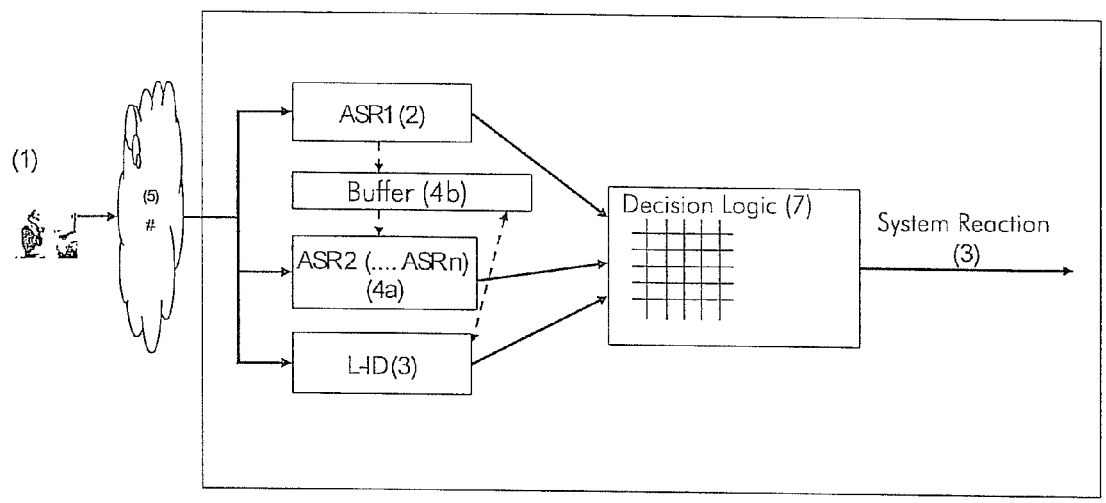
FIG. 1 is a schematic diagram showing a speech dialogue system with language identification.

Referring to FIG. 1, a speech dialogue system 6 is provided with a system for classifying at least two languages 3 and at least one speech recognition system 2. The speech recognition system includes either one speech recognizer, which can process at least two languages in parallel and/or sequentially, or a plurality of speech recognizers 2, 4a, which are suitable for processing different languages. Further components are a device for the decision-making logic 7 and a network 5 via which the data are transmitted from the person speaking. Logical evaluation of the languages can include collecting and evaluating statistically relevant speech data and can be carried out by using at least one of a neuronal network, a hidden Markov model and a fuzzy logic.

The speech recognizer(s) 2, 4a provide at least the following results and/or signals with the following meanings:

match (a valid speech input has been recognized)
nomatch (the speech input is not valid)
and/or
noinput (nothing has been said and the waiting time for a user utterance has expired)

The language identification system 3 usually supplies the following result values and/or signals with the following meanings:

e.g. German, English, French or another identifier and/or designation for at least one classified language unknown (language unknown)

In addition, values (probability values, confidence values) can be output that reflect the reliability ("confidence") of results.

As described in the last section, in addition to the results that the methods of language identification 3 supply, the results of the speech recognition methods 2 and 4 are also included. The utterance that is passed to the language identification 3 is also evaluated by the speech recognition 2 and 4. Herein, in the first step, it is only evaluated whether the result is a match (a valid input has been recognized) or a nomatch (no valid input has been recognized) or a noinput (nothing has been said). The actual content of the input is unimportant at this point. If the language identification 3 returns a language other than the currently active main language, the signal held in the buffer is evaluated a second time via the speech recognizer 4, but this time on the basis of the grammar of the language recognized by the language identification 3. Here also, there are the two principal conditions: match (valid input) or nomatch (invalid input).

Figure 2:
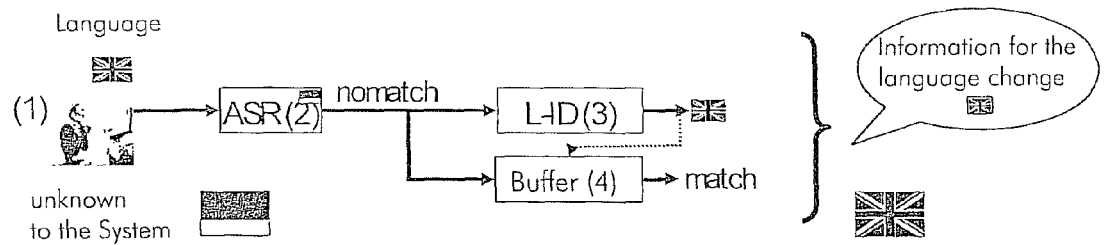
FIG. 2a is a schematic diagram showing a sequence for evaluating a speech signal when changing a language, making use of language identification.
FIG. 2b is a schematic diagram showing a representation of a sequence for evaluating a speech signal when continuing a dialogue in a main language.

FIG. 2a shows in schematic form the sequence and the flow of signals for evaluation of the speech signal. The example chosen represents a sequence wherein an English-speaking caller is connected to a German-language speech dialogue application: an English-speaking caller calls a German-language dialogue application and speaks English from the start. The speech recognizer 2 set to German does not recognize the utterance and consequently supplies a nomatch (invalid input). The language identification 3 classifies the utterance as English. The signal held in the buffer 4 is then evaluated once more via a speech recognizer set to English and is recognized (match, valid input). This may be another speech recognizer or the speech recognizer which was originally set to German in the first method, as described, and subsequently reset in the grammar and acoustic models to English. The dialogue is then continued in English. It should be noted that the individual modules can also operate in parallel, particularly when sufficient computing power is available.

Figure 2B:
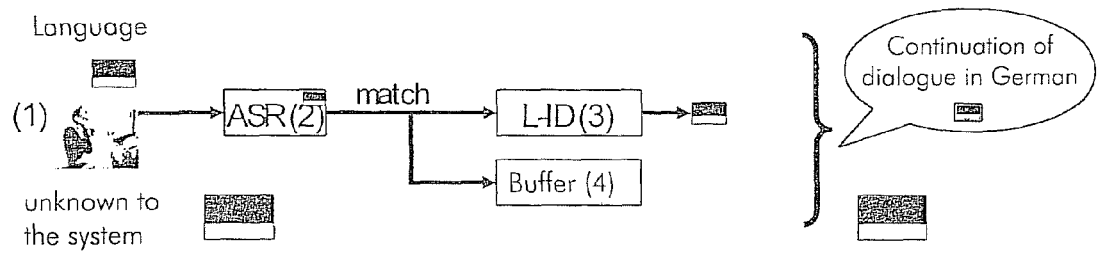

FIG. 2b shows the continuation of the method in the event that the language is correctly identified. The dialogue is then continued with the previously set language.

The decision as to how the speech input should continue therefore depends on the combination of results from the language identification 3 and the speech recognition 2. If the caller 1 does not actively make an utterance, the speech recognition returns the value noinput (for a lack of input). This eventuality must also be taken into account in the decision. The manner in which the method proceeds after evaluation of the first utterance can be individually designed and depends, in the first place, on the resources that are made available. The decision has to be made as to whether, apart from, e.g., the German-language speech dialogue application, identically structured speech dialogue applications should exist in the target languages. An advantage of what is designated here is that all callers are held in the speech dialogue and an increased call volume does not arise. A disadvantage is the complex translation into other languages, since, apart from the creation of the language prompts, it must also be considered that grammars have to be created for the target languages. In speech applications with continually changing content, the maintenance work involved also increases accordingly.

If only a few foreign language callers are expected, then the effort required to generate the foreign-language dialogue application may not be justified. A cut-down concept for the passing on to foreign-language advisors could be implemented. Solutions and examples of applications for both these concepts will now be described. Also conceivable are mixed solutions.

Figure 3:
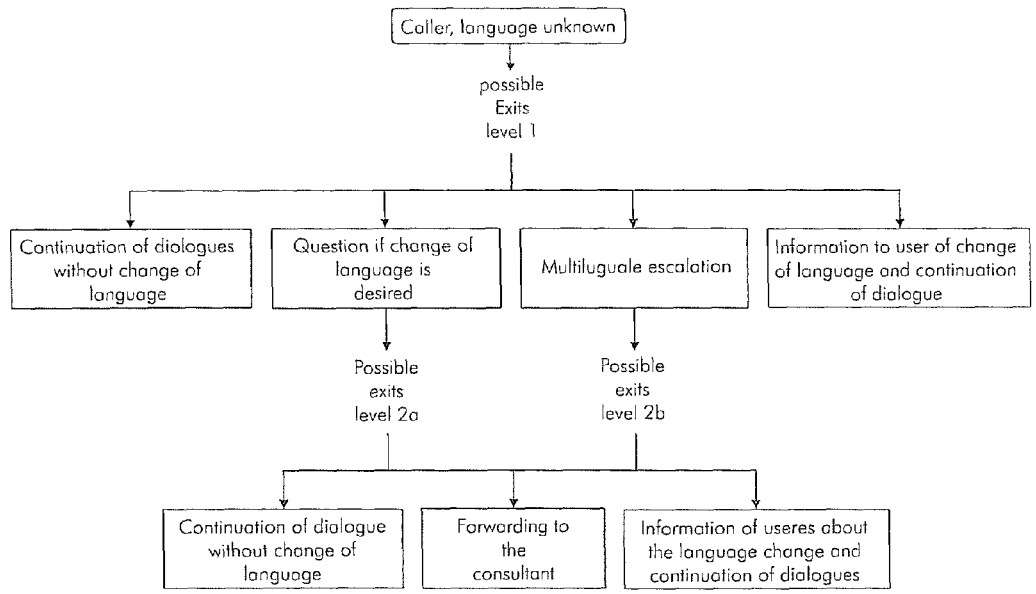
FIG. 3 is a flow diagram showing a multiple-step method for automatic language identification, according to an exemplary embodiment of the present invention.

It is an aspect of combined identification of spoken language to assign the caller to the speech dialogue which is worded in his mother tongue. For this purpose, according to an exemplary embodiment of the present invention, the following multiple-step method is used (see also FIG. 3).

Following the first utterance of the caller, in cases where the decision of the language identification tends to indicate or definitely indicates the current language, no change of language takes place (continue without change of language). If an allocation to a language other than the current language can be made with certainty, the caller receives information on the change of language and the dialogue is continued in the new target language (information about change of language and continuation of dialogue). In both these cases, the language identification is then deactivated at this point.

If, however, a tendency towards another target language is recognized, a direct inquiry is made as to whether the caller wishes to continue in the recognized target language (query change of language). The answer to this question is also evaluated in the second step (step 2a) with the aid of the language identification. Depending on the answer to the question and/or the combination with the identification result, the dialogue language is either kept or changed. If the input by the caller does not lead to a conclusive allocation, the caller can be passed on to an adviser who should be capable of mastering both the current language and the possibly detected alternative language. If the result of the language identification is so uncertain in the first step that no clear tendency to one language can be discerned (e.g. by a lack of input (noinput)), the caller passes into the multilingual escalation system. Here, he is requested in all the (e.g. three) possible languages provided to express his wish. Here also, in the second step (step 2b), the language identification is used again. Depending on the result, in this case the dialogue is continued or passed on to an adviser who, in the best case, masters all the possible target languages.

Figure 4:
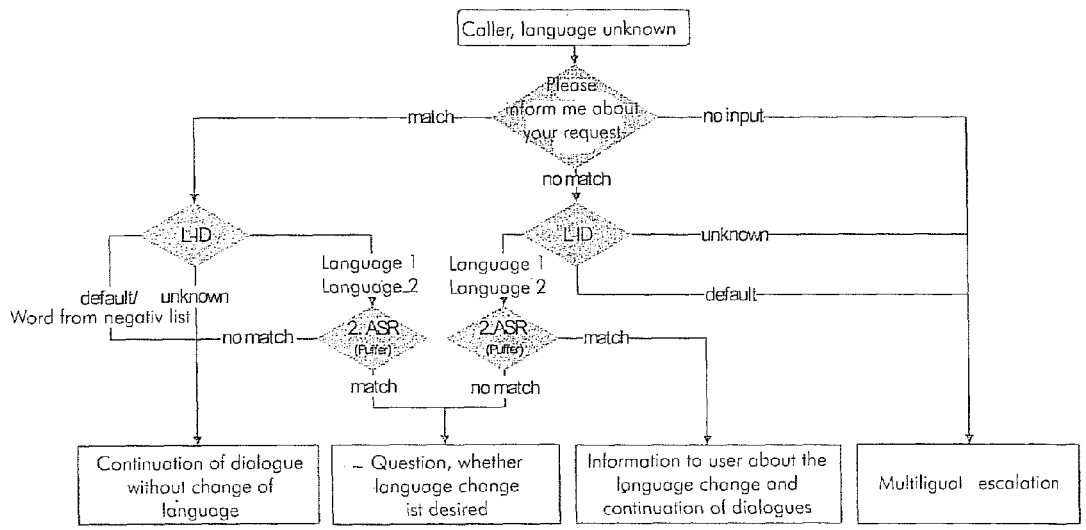
FIG. 4 is a flow diagram showing evaluation of a first utterance of the caller, according to an exemplary embodiment of the present invention.

The next sections describe how the result values control the system decision process. Details of this are shown in FIG. 4.

As described above, the method according to the invention is based on automated language identification in order to allocate the correct target language to the caller. Overall, there is a plurality of partial aspects where language identification is used. The precise mode of operation of these three steps will now be described in greater detail. In this regard, the designations according to the table in FIG. 7 are used for the languages that are implemented.

A method according to an exemplary embodiment of the present invention involves combined evaluation of the initial results of at least one speech recognition procedure, the language identification and at least one possible subsequent second speech recognition procedure. Since classifiers of this type are always subject to a certain percentage of misidentification, all possible combinations of the three evaluation steps must be looked at carefully to let the system react meaningfully to the situation. A few fundamental rules are observed:

1. If a speech recognition result is valid, in case of doubt it is called upon, since it can be assumed in this case that the caller has made an utterance in the preset (default) language.
2. This language will then only be changed automatically and without inquiries being made if all three evaluation results support the thesis.
3. If a clear tendency towards a language is discernible, then the caller is asked whether a change of language is desired.

If none of the above rules can be applied, then in a next step, multilingual escalation should be employed.

The table in FIG. 8 shows the possible combinations and the corresponding system reactions of the first step of the combined language identification procedure. Herein, in column 2 (L-ID) only the first foreign language is given; the reaction is identical for every further foreign language. The flow diagram in FIG. 4 makes clear again the sequence of the decision tree.

Once the caller has expressed his concern, in the first step, step 1, an evaluation is carried out using the current speech recognizer (2). If the result value is a noinput (lack of input), then a multilingual escalation strategy is used (see also the table in FIG. 10), in order to motivate the caller (1) to make an utterance (preferably, in his mother tongue). A detailed description of the multilingual escalation will be given later.

If the speech recognizer (2) returns a match (valid input), the probability that it is the preset (default) language, that is the currently active language, is high. Nevertheless, error recognition is conceivable, so that evaluation of the language identification (4) follows next. If this also supplies the preset (default) language as the result, the dialogue is continued without a change of language and the language identification (3) can be deactivated.

The same applies to utterances for which the language cannot be allocated (unknown). This decision is based therein that a more precise evaluation of the language identification (3) is not possible in this case. However, since a valid utterance was returned as the result of the first speech recognition procedure (2), on the basis of this utterance, the dialogue is continued. If the result of the language identification (3) is that it is another language (e.g. language1/language2; default/language1), then the utterance held in the buffer (4) is evaluated a second time by a speech recognizer, this time using the grammar and the acoustic models of the target language. If the result is a match (valid input), then it is likely that the caller has used a language other than the preset language. A change to the recognized target language is then offered to him. This offer is made both in the new target language as well as in the currently set language. If the second speech recognition process using the buffer content (4) supplies a nomatch (invalid input), then in this case also the match (valid input) from the first speech recognition process (2) applies. The dialogue is then continued without a change of language. In the event that the first speech recognition process (2) returns a nomatch (invalid input), the language identification (3) is again used. If this returns the value unknown (language could not be determined) or default (preset language), further evaluation by the second speech recognition process using the buffer (4) is not useful. The route of multilingual escalation should now be followed, i.e. the caller is requested in all (e.g. three) languages that are provided to repeat his wish. In other cases, evaluation by the second speech recognition process is also carried out using the buffer (4) in the recognized target language. If this returns a match (valid input), all three recognition steps return the consistent result that the utterance is in a language other than the preset (default) language. The caller is informed about the change of language and the dialogue is continued in the new target language. If the second speech recognition process using the buffer (4) also returns a nomatch (invalid input), no statement of such certainty can be made. However, since a strong likelihood of a new target language remains, a change of language is offered to the caller in this case also.

It should be mentioned again at this point that this method is just one possible embodiment. If a non-queried switch over to a new target language is considered to be too harsh, then a different mode of operation can easily be substituted in this event. The decision matrix is introduced into the system such that changing a system reaction can be carried out by a simple table entry. This applies similarly for the decision matrix step 2a (table in FIG. 9) and step 2b (table in FIG. 10).

Step 2a (see table in FIG. 9) of the method is reached when a clear likelihood of a language is discernible. In this event, the caller is asked whether he wishes to continue in the detected second language. Since there is always some uncertainty about the target language and it cannot be assumed that the caller actually understands the foreign language, this question is put, for example, in two languages. If the caller is currently in a German dialogue application and the likelihood exists that he has spoken English, then the relevant question is: "Do you want to continue in English? Möchten Sie in Englisch weitermachen?" The answer to this question may be given by the caller in any of the provided (e.g. three) languages, since at this point a grammar including suitable acoustic models is implemented which understands "yes/no" in all the provided languages. Since a universal grammar is in use, the second speech recognition process can be dispensed with, since it is unable to provide a new result.

The question as to the change of language also represents a further distinctiveness of step 2a, since this intermediate question "interrupts" the actual concern of the caller. In the event of a previous match (valid input) in step 1, the content of the speech recognizer is stored so that—following answering of the question concerning the change of language—the process can be continued at the same place, since the dialogue has been interrupted. Stored data can include pre-processed digitized spoken language data. The method to pre-process the digitized spoken language can include at least one of a echo compensation method, a noise reduction method and an encoding method.

Therefore, in the decision matrix 2a (table in FIG. 9), the outcome of both the speech recognition processes must be taken into account. Since the question as to the change of language can only be reached when either both recognition processes return a match (valid input) or both return a nomatch (invalid input), when the decision matrix is set up, a blanket consideration of match/nomatch (valid/invalid input) is sufficient, i.e. no differentiation has to be made concerning which of the two recognition processes provides the result or will be used for the further process. The condition match (valid input) is replaced in this case by the possible answers "yes" and "no", since they represent the explicit wish of the caller and should be taken into account in any event. Therefore in these cases, further evaluation using the language identification is dispensed with.

Figure 5A:
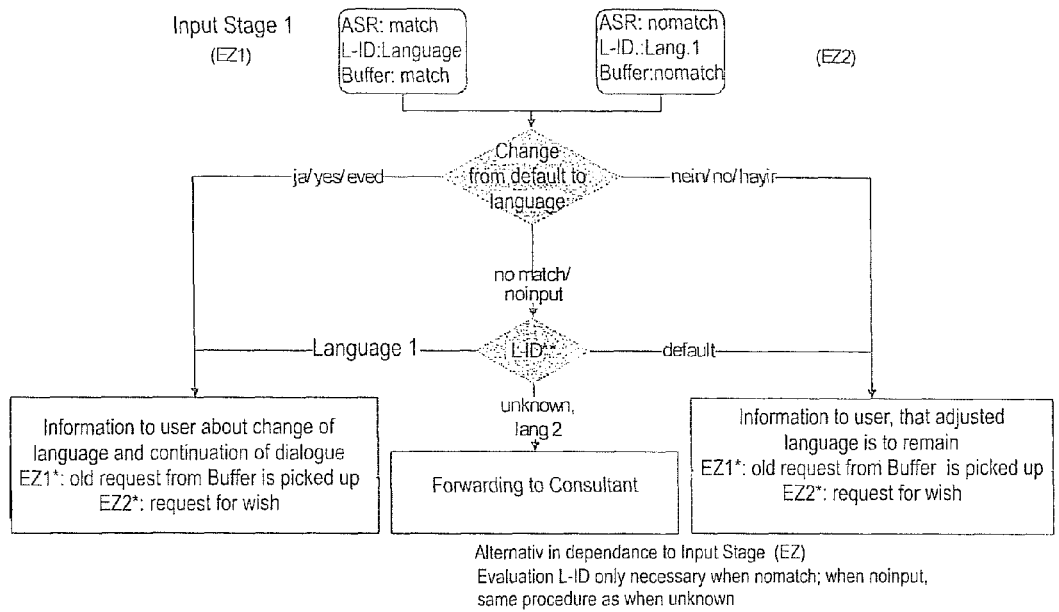
FIG. 5a is a flow diagram showing a method, according to an exemplary embodiment of the present invention, for a question concerning change of language in relation to FIG. 2.

A further distinctiveness is that it is possible—even if very unlikely—that the language identification in the first step recognizes a different language from that of step 2a. This information should therefore also be considered at the stated points. The two input conditions depicted in FIG. 5a show the possible combinations of results from step 1 which lead to the question of a change of language. Generally, it is noteworthy that with the exemplary description of the method, in case of doubt, it is assumed that the caller is a person who uses the preset (default) language.

Finally, following step 2a, the language identification can be deactivated and thereafter every combination of the results values must result in a condition in which the wish of the caller can be serviced. This represents only one possible embodiment.

Multilingual escalation, called step 2b here (see table in FIG. 10) is far less complex in its structure than step 2a in which a query is made about a change of language. The reason for this is that the dialogue flow is not interrupted by an additional query. Furthermore, the input conditions are far less complex. Multilingual escalation can only be achieved in the combinations: nomatch-default (invalid input—preset language), nomatch-unknown (invalid input—language could not be determined), and noinput (no input) (see FIG. 8). It can therefore practically be assumed that either the caller is speaking the current language or that the caller has spoken a language that is not implemented. Since there is as yet no statement that can be evaluated, the user must be required, in any event, to make a new utterance. Evaluation of the results of the first step can therefore be dispensed with. Since, following multilingual escalation, combined language identification is also initiated in every case, in the event that again no allocation can be made, the caller can be passed to an adviser with the relevant foreign language expertise.

Figure 5B:
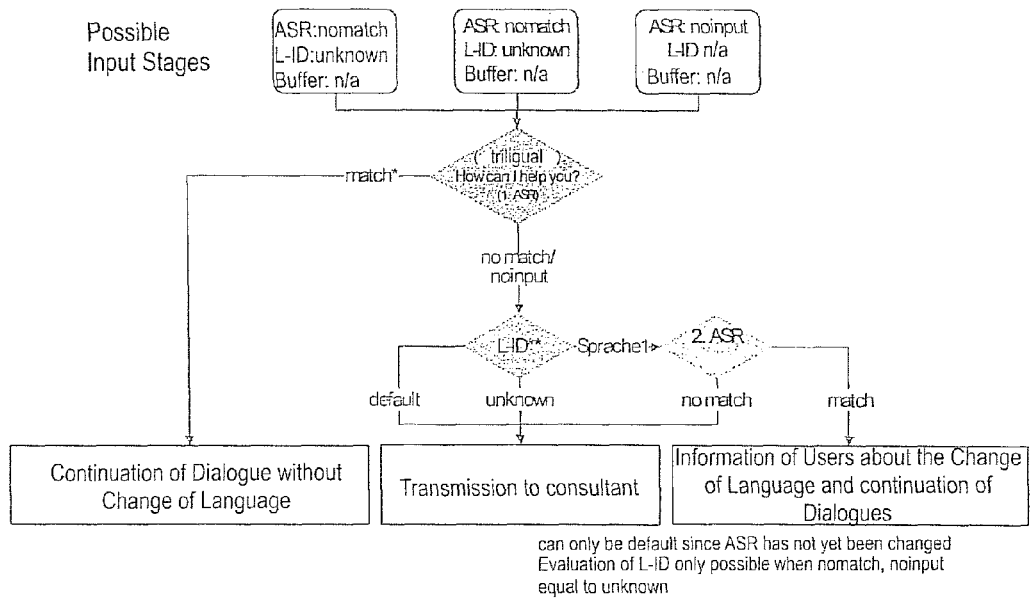
FIG. 5b is a flow diagram showing multilingual escalation, according to an exemplary embodiment of the present invention, in relation to FIG. 2b.

The three input conditions shown in FIG. 5b reveal the possible combinations of results from step 1. In general, it can be noted that in case of doubt, given the exemplary specification of the method, it is assumed that the caller is a person who uses the preset (default) language.

The method described herein using the decision matrix represents one possible embodiment of the present invention.

Figure 6:
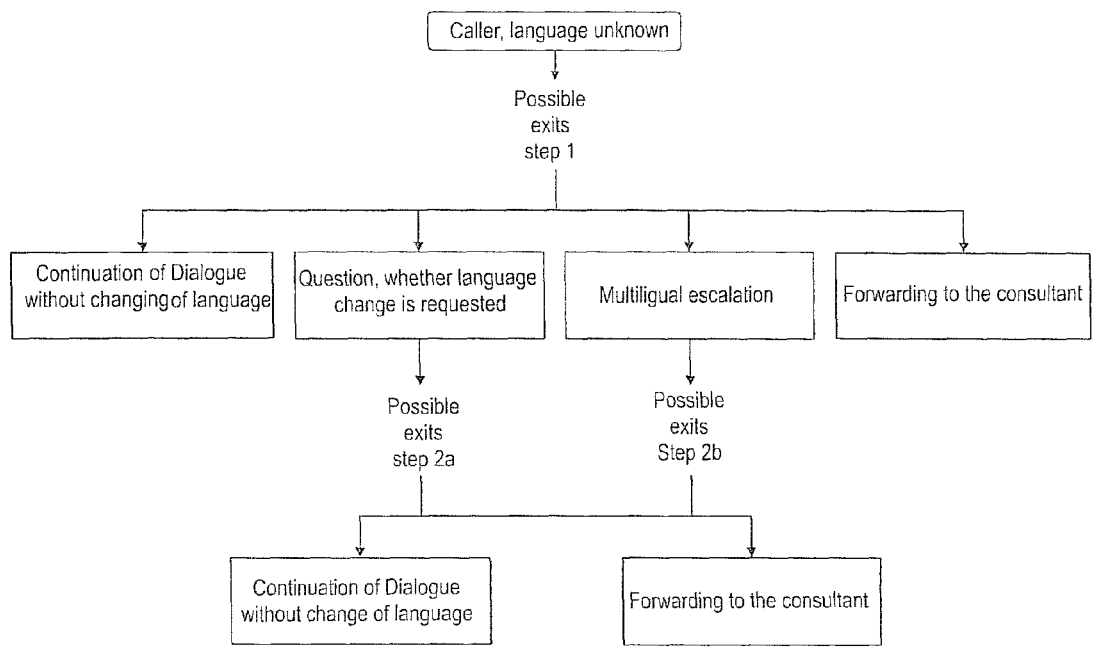
FIG. 6 is a flow diagram showing a shortened method for automatic language identification, according to an exemplary embodiment of the present invention.

The method according to an exemplary embodiment of the present invention described above provides that a speech dialogue is reflected in its entirety in all the target languages. Particularly where the content is changing rapidly, this represents a high level of effort, which is not justified in all cases. An alternative thereto, in the cut-down concept (see also FIG. 6), is passing on to an adviser who has expertise in the relevant language. Also possible are mixed solutions wherein only the most frequently visited dialogue branches are represented for all languages.

For targeted passing on to an adviser with relevant foreign language expertise, automatic speech classification is also used. The principle does not differ from the general method described, since here also the caller meets a multilingual speech dialogue application in the first step. Only after the first utterance is the system able to allocate the language and to decide where to pass the caller.

In the cut-down method described, all foreign-language callers should be passed to an adviser for their own mother tongue. In addition, unnecessary passing of callers using the main language to an adviser should be avoided. The method is therefore also structured in two steps.

In the first step, the callers who can be definitively allocated to a language are passed on according to the prior settings. Callers using the main language are passed on to the relevant speech dialogue application and foreign-language callers are connected to an adviser who speaks their mother tongue.

Depending on the results of the evaluation of the first combined language identification, all other callers are either asked directly whether they wish to speak another language, or else they find their way to the multilingual escalation. These two steps are carried out similarly to the steps described in the general method. In place of passing on into the corresponding language dialogue application, here also only a caller in the main language is passed on to the speech dialogue application and all other callers are passed to an adviser for the respective national language. If the language has still not been determined after the second stage of the combined language identification, in an ideal case the caller is connected to an adviser who has expertise in all three languages. If this is not possible (e.g. because significantly more languages are linked in), an adviser should be chosen who has expertise in possible key languages (e.g. English or Spanish).

Parts or the entirety of the present invention can be carried out with computer programs which operate in combination with hardware.

What is claimed is:

1. A method for classification of at least two languages in an automatic computer based dialogue system comprising:
   applying a speech recognition method and a language identification method to digitized speech input using a processing unit; and
   identifying a language of the speech input using logical evaluation of results of the speech recognition method and the language identification method,
   wherein if the speech recognition method is unable to recognize the speech input then the language identification method is used to classify the speech input and, if the classification was successful, at least one of the speech recognition method and a parameter of the speech recognition method is changed so that speech recognition is carried out with the changed speech recognition method.

2. The method according to claim 1, wherein the results of the speech recognition method or the language identification method include a result condition.

3. The method according to claim 1, wherein the logical evaluation of the results of at least one of the speech recognition method and the language identification method include at least one character string, digital symbol, and symbol string.

4. The method according to claim 1, further comprising temporarily storing additionally digitized speech data determined from the speech input, the additionally digitized speech data including at least one of extracted feature data and audio data.

5. The method according to claim 4, further comprising describing the temporarily stored data by at least one of the speech recognition method and the language identification method.

6. The method according to claim 4, further comprising describing the temporarily stored data in the temporary digital store by at least one method configured to preprocess digitized spoken language.

7. The method according to claim 6, wherein the method configured to pre-process digitized spoken language is at least one of a echo compensation method, a noise reduction method and an encoding method.

8. The method according to claim 1, further comprising affecting a subsequent dialogue with a user by a result of the logical evaluation.

9. The method according to claim 1, wherein the applying the language identification method and the speech recognition method are carried out in chronological sequence or in parallel.

10. The method according to claim 1, further comprising providing a decision-making logic including deterministic rules that are changeable administratively or by programming.

11. The method according to claim 1, further comprising creating the logical evaluation by collecting and evaluating statistically relevant speech data and by using at least one of a neural network, a hidden Markov model and a fuzzy logic.

12. A method for classification of at least two languages in an automatic computer based dialogue system comprising:
    applying a speech recognition method and a language identification method to digitized speech input using a processing unit; and
    identifying a language of the speech input using logical evaluation of results of the speech recognition method and the language identification method, and including the steps of:
    a. if a valid speech recognition result has been obtained, retaining the valid speech recognition result for future dialogues;
    b. if a first attempt at recognition by a speech recognition method in a first language has failed, the language identification method has recognized a new language and if a second attempt at recognition by a speech recognition method in the new language recognized by the language identification method is successful, automatically altering the language without queries; and
    c. if neither step a nor step b can be applied using a multilingual escalation.

13. The method according to claim 12, wherein if one language is discernible by a certain probability and a corresponding classification by the processing unit, a caller is asked whether he or she wishes a change of language.

14. The method according to claim 13, wherein the results of the speech recognition are:
- a match, the match being a recognized valid input, the match determinable through at least one of a probability and confidence values;
- a nomatch, the nomatch recognized as no valid input, the nomatch determinable through at least one of a probability and confidence values; or
- a noinput, the noinput recognized as nothing said,
- wherein, the result determines whether the language is changed or retained or whether a dialogue is started with the caller.

15. A digital device for classifying at least two languages in an automatic dialogue system which processes digitized speech, comprising a digital processing arrangement including a speech recognizer and a language identification system, the digital processing arrangement being configured to recognize a language of the digitized speech input through logical evaluation of results of a speech recognition method carried out by the speech recognizer and a language identification method applied, by the language identification system, to the speech input,
  wherein the digital processing arrangement is configured such that, if the speech recognition method is unable to recognize the speech input, the language identification method is used to classify the speech input and, if the classification was successful, at least one of the speech recognition method and a parameter of the speech recognition method is changed so that the speech recognition is carried out with the changed speech recognition method.

16. The device according to claim 15, wherein the digital processing arrangement is configured such that the results of the speech recognition method or the language identification method include at least one result condition.

17. The device according to claim 15, wherein the digital processing arrangement is configured such that the logical evaluation of the results of at least one speech recognition method and language identification method include at least one character string, digital symbol and symbol string.

18. The device according to claim 15, wherein the digital processing arrangement is configured such that additional feature vectors or other digitized data determined from the speech input are temporarily stored, the temporarily stored data including at least one of extracted feature data and audio data.

19. The device according to claim 18, wherein the digital processing arrangement is configured such that the temporarily stored data is described by at least one of the speech recognition method and the language identification method.

20. The device according to claim 18, wherein the digital processing arrangement is configured such that the temporarily stored data is described by at least one method configured to pre-process digitized spoken language.

21. The device according to claim 15, wherein the digital processing arrangement is configured such that a result of the evaluation logic affects subsequent dialogue with a user.

22. The device according to claim 15, wherein the digital processing arrangement is configured such that the methods for language identification or speech recognition are carried out in chronological sequence or in parallel.

23. The device according to claim 15, wherein the digital processing arrangement is configured such that the logical evaluation includes deterministic rules on a storage unit that are changeable administratively or by programming.

24. The device according to claim 15, wherein the digital processing arrangement is configured such that the logic evaluation is established by collecting and evaluating statistically relevant speech via at least one of an echo compensation arrangement, a noise reduction arrangement and an encoding arrangement.

25. A digital device for classifying at least two languages in an automatic dialogue system which processes digitized speech, comprising a digital processing arrangement including a speech recognizer and a language identification system, the digital processing arrangement being configured to recognize a language of the digitized speech input through logical evaluation of results of a speech recognition method carried out by the speech recognizer and a language identification method applied, by the language identification system, to the speech input,
  wherein the digital processing arrangement is configured such that the following steps can be fully carried out:
  a. if a valid speech recognition result has been obtained, the valid speech recognition result is retained for future dialogues;
  b. if a first attempt at recognition by a speech recognition method in a first language has failed, the language identification method has recognized a new language and if a second attempt at recognition by a speech recognition method in the new language recognized by the language identification method is successful, the language is automatically altered without queries; and
  c. if neither step a nor step b can be applied a multilingual escalation is used.

26. The device according to claim 25, wherein the digital processing arrangement is configured such that if one language is discernible by a certain probability and a corresponding classification by the processing unit, a caller is asked whether a change of language is desired.

27. The device according to claim 25, wherein the digital processing arrangement is configured such that the results of the recognition are:
- a match, the match being a recognized valid input, the match determinable through at least one of a probability and confidence values;
- a nomatch, the nomatch recognized as no valid input, the nomatch determinable through at least one of a probability and confidence values; or
- a noinput, the noinput recognized as nothing said,
- wherein, the result determines whether the language is changed or retained or whether a dialogue is started with the caller.

28. A computer readable medium having stored thereon computer executable process steps operative to perform a method for classification of at least two languages in an automatic computer based dialogue system, which processes digitized speech input using a processing unit, the method comprising the steps of:
  applying a speech recognition method and a language identification method to the digitized speech input; and
  identifying a language of the speech input using logical evaluation of results of the speech recognition method and the language identification method,
  wherein if the speech recognition method is unable to recognize the speech input then the language identification method is used to classify the speech input and, if the classification was successful, at least one of the speech recognition method and a parameter of the speech recognition method is changed so that speech recognition is carried out with the changed speech recognition method.

* * * * *